(12) United States Patent
Benchaib et al.

(10) Patent No.: US 7,095,197 B2
(45) Date of Patent: Aug. 22, 2006

(54) METHOD AND SYSTEM FOR REGULATING INSTANTANEOUS ELECTROMAGNETIC TORQUE AND STORAGE MEDIUM FOR IMPLEMENTING THE METHOD

(75) Inventors: Abdelkrim Benchaib, Montigny le Bretonneux (FR); Jean-Luc Thomas, Fontainebleau (FR); Serge Poullain, Arpajon (FR); Jean-Claude Alacoque, Communay (FR)

(73) Assignee: ALSTOM, Paris (FR)

( * ) Notice: Subject to any disclaimer, the term of this patent is extended or adjusted under 35 U.S.C. 154(b) by 168 days.

(21) Appl. No.: 10/855,890

(22) Filed: May 28, 2004

(65) Prior Publication Data
US 2005/0001571 A1    Jan. 6, 2005

(30) Foreign Application Priority Data
Jun. 2, 2003    (FR) ................................. 03 06634

(51) Int. Cl.
*H02P 7/00* (2006.01)
(52) U.S. Cl. .................. 318/432; 318/433; 318/722; 318/811; 363/40; 363/41
(58) Field of Classification Search ........ 318/430–433, 318/443, 722, 811; 363/40, 41
See application file for complete search history.

(56) References Cited

U.S. PATENT DOCUMENTS

| | | | | | |
|---|---|---|---|---|---|
| 4,023,083 | A | * | 5/1977 | Plunkett | 318/802 |
| 4,047,083 | A | * | 9/1977 | Plunkett | 318/807 |
| 4,490,666 | A | * | 12/1984 | Tanamachi et al. | 318/800 |
| 5,619,114 | A | * | 4/1997 | Blasko | 318/812 |
| 5,850,132 | A | * | 12/1998 | Garces | 318/599 |
| 6,094,364 | A | * | 7/2000 | Heikkila | 363/41 |
| 6,307,759 | B1 | * | 10/2001 | Inarida et al. | 363/37 |
| 6,426,602 | B1 | * | 7/2002 | McCann et al. | 318/432 |
| 6,541,933 | B1 | * | 4/2003 | Leggate et al. | 318/599 |

(Continued)

FOREIGN PATENT DOCUMENTS

EP    848 487 A2    6/1998

(Continued)

OTHER PUBLICATIONS

Oleschuck V. et al: Synchronized Pulsewidth Modulation for Different Control Regimes of AC Drives; IECON-2002. Proceedings of the 28th. Annual Conference of the IEEE Industrial Electronic Socieity. Sevilla, Spain, Nov. 5-8, 2002, Annual Conference of the IEEE Industrial Electronics Society, New York, NY: IEEE, U.S. vol. 1 of 4. Conf 28, Nov. 5, 2002, pp. 1416-1421, XP010632913.

(Continued)

*Primary Examiner*—Paul Ip
(74) *Attorney, Agent, or Firm*—Sughrue Mion, PLLC

(57) ABSTRACT

A method is described of regulating the instantaneous electromagnetic torque of a polyphase rotating electrical machine equipped with stator and/or rotor windings supplied by a voltage and a current generated by an inverter formed of switches whose switching is controllable. The method comprises a step of commanding the switching of the switches of the inverter using the fundamental frequency of the voltage generated by the inverter and a form of synchronous pulse width modulation configured as a function of an input set point, and a step of calculating the input set point from an instantaneous torque set point at each regulation time. The method further comprises a step of determining the time interval between two successive regulation times so that the time interval corresponds to an integer multiple of the period of oscillation of the instantaneous torque of the machine.

11 Claims, 4 Drawing Sheets

U.S. PATENT DOCUMENTS

| | | | |
|---|---|---|---|
| 6,674,262 B1* | 1/2004 | Kitajima et al. | 318/722 |
| 6,847,186 B1* | 1/2005 | Kerlin | 318/751 |
| 6,888,330 B1* | 5/2005 | Arimitsu | 318/433 |
| 2002/0097015 A1* | 7/2002 | Kitajima et al. | 318/432 |
| 2004/0056629 A1* | 3/2004 | Maeda et al. | 318/719 |
| 2004/0169482 A1* | 9/2004 | Maeda | 318/443 |
| 2005/0001572 A1* | 1/2005 | Benchaib et al. | 318/432 |
| 2005/0088861 A1* | 4/2005 | Baumgart | 363/40 |

FOREIGN PATENT DOCUMENTS

EP  1 107 448 A2  6/2001

OTHER PUBLICATIONS

Patent Abstracts of Japan, vol. 1998, No. 1, Jan. 30, 1998 & JP 09 247953, Sep. 19, 1997.

* cited by examiner

METHOD AND SYSTEM FOR REGULATING INSTANTANEOUS ELECTROMAGNETIC TORQUE AND STORAGE MEDIUM FOR IMPLEMENTING THE METHOD

BACKGROUND OF THE INVENTION

1. Field of the Invention

The invention relates to a method and a system for regulating the instantaneous electromagnetic torque of a polyphase rotating electrical machine and an information storage medium for implementing this method.

2. Description of the Prior Art

To be more precise, the invention relates to a regulation method in which the rotating electrical machine is equipped with stator and/or rotor windings supplied by a voltage and a current generated by an inverter formed of switches whose switching is controllable, said method comprising:

a step of commanding the switching of the switches of the inverter using the fundamental frequency of the voltage generated by the inverter and a form of synchronous pulse width modulation configured as a function of an input set point, and a step of calculating the input set point from an instantaneous torque set point at each regulation time.

In the remainder of the description, the terms "motor" and "torque" respectively denote a polyphase rotating electrical machine and the electromagnetic torque of this kind of machine. Moreover, the terms "fundamental" and "harmonic" respectively denote the sinusoidal component with the lowest frequency and the harmonics of second or higher order of a signal.

Thus the term harmonic as used herein refers only to harmonics of the second or higher order.

Methods of regulating the instantaneous torque of a motor are used in many fields, for example to control rolling mill drive motors.

There are many methods of using an inverter to chop a direct current voltage to create a polyphase alternating current voltage. Of such methods, those using pulse width modulation (PWM) are the most widely used. Pulse width modulation is divided into two families, respectively denoted "asynchronous" and "synchronous".

Asynchronous pulse width modulation determines the switching times of the switches of the inverter from the intersection of a high-frequency carrier that is asynchronous with respect to the frequency of the fundamental of the voltage generated by the inverter and a modulating sinusoid at the required stator frequency.

Synchronous pulse width modulation, on the other hand, is synchronized to the fundamental frequency of the voltage generated by the inverter, and is defined by angles defining the times of occurrence and the number of switching operations during each fundamental period of the generated voltage. Typically, since each form of synchronous pulse width modulation corresponds to a particular voltage generated by the inverter, the control unit is adapted to employ several forms of synchronous pulse width modulation. In the present context, each form of synchronous pulse width modulation is defined by the particular value of the angles used to construct it. Thus in the remainder of this description two forms of synchronous pulse width modulation having different angle values each correspond to a different form of pulse width modulation.

During the regulation process, the control unit selects the form of pulse width modulation to use as a function of the amplitude of the voltage that the inverter must generate, for example.

For each form of modulation, the value of the angles used is generally precalculated to eliminate certain predefined harmonics, which is one advantage of synchronous pulse width modulation.

In the case of methods of regulating the instantaneous torque of a motor, the form of modulation is selected as a function in particular of the instantaneous torque set point. It has been found that control methods of this kind can achieve the advantages associated with the use of synchronous pulse width modulation only partially, if at all. This is because, although each form of modulation is constructed to eliminate certain harmonics, this occurs only partially, if at all.

The invention therefore aims to remedy this problem by proposing a method of regulating the instantaneous torque of a motor that uses synchronous pulse width modulation control and retains the advantages associated with using asynchronous pulse width modulation.

SUMMARY OF THE INVENTION

The invention therefore provides a method of regulating the instantaneous electromagnetic torque of a polyphase rotating electrical machine equipped with stator and/or rotor windings supplied by a voltage and a current generated by an inverter formed of switches whose switching is controllable, said method comprising:

a step of commanding the switching of the switches of the inverter using a pulse width modulation synchronous with the fundamental frequency of the voltage generated by the inverter and wherein the pulse width modulation is configured as a function of an input set point, and a step of calculating the input set point from an instantaneous torque set point at each regulation time, and a step of determining the time interval (T) between two successive regulation times so that, as long as the instantaneous torque set point is constant, that time interval corresponds to an integer multiple of the period of oscillation of the instantaneous torque of the machine caused by second order or higher harmonics of the voltage and/or the current generated by the inverter.

The various types of modulation are constructed to eliminate certain harmonics of the voltage generated by the inverter. Not all of the harmonics are eliminated, however, which causes oscillation of the instantaneous torque. To be more precise, the instantaneous torque results from the superposition of a substantially constant fundamental torque created by the fundamental frequency of the voltage and a pulsating torque created by the harmonics of the voltage. This pulsating torque oscillates several times in each period of the fundamental frequency of the voltage.

FIG. 1 represents the evolution of the instantaneous torque of a motor during a period T' of the fundamental frequency of the voltage generated by an inverter controlled by synchronous pulse width modulation. The curves 4 and 6 represent the evolution of the instantaneous torque $\Gamma_S$ with time when a first form $MLI_1$ of synchronous pulse width modulation and a second form $MLI_2$ of synchronous modulation that are different are used. Each of these curves features oscillations about a mean value represented by respective dashed horizontal axes $\Gamma_{m1}$ and $\Gamma_{m2}$. To simplify FIG. 1, the periods denoted T of the oscillations of the instantaneous torque generated by the modulation $MLI_1$ and the modulation $MLI_2$ are shown as identical. Also, to simplify the explanation given hereinafter, these oscillations are represented as being in phase. The instantaneous torque set point is represented by the thin horizontal line $\Gamma_{CS}$.

In this example, each minimum on the curve 4 and each maximum on the curve 6 are situated on the thin line $\Gamma_{CS}$.

It is assumed now that the regulation method is one employing an exact response control operation so as to reach the instantaneous torque set point at the next regulation time.

To explain better how the above method solves the problem stated, the causes of the problem are explained in more detail hereinafter, assuming first of all that a prior art regulation method is used in which the regulation interval is chosen arbitrarily. In this example, to simplify the explanation, it is assumed that the arbitrarily chosen regulation interval is T/2.

In this situation, at the time 0, the exact response control method selects the modulation $MLI_1$ to reach the set point $\Gamma_{cs}$ at the next regulation time.

At the next regulation time T/2, the exact response control method selects the modulation $MLI_2$ to reach the set point $\Gamma_{cs}$ at the time T.

In the purely illustrative context of FIG. 1, it is therefore seen that for the same constant instantaneous torque set point $\Gamma_{CS}$, the exact response control method selects the modulation $MLI_1$ and the modulation $MLI_2$ alternately. Now, each change of modulation creates harmonics that may not be limited by the construction of the modulation $MLI_1$ and the modulation $MLI_2$.

This explains why the advantages of using synchronous pulse width modulation are not obtained when it is used in the context of a prior art method of regulating the instantaneous torque.

To solve this problem, the above method proposes to determine the regulation times so that they are integer multiples of the period of the instantaneous torque oscillation caused by the current and voltage harmonics. Accordingly, in the particular case of FIG. 1, the regulation times determined are integer multiples of the period T. Provided that the set point $\Gamma_{CS}$ is constant, the exact response control operation then leads to selecting the same form of pulse width modulation at each regulation time, for example the modulation $MLI_2$ in this example. This considerably reduces the number of changes of modulation type, and each modulation type is selected for a sufficiently long time for the harmonics that must be eliminated to be eliminated.

According to other features of the method according to the invention:

the calculation step uses an exact response control method such that the instantaneous torque set point is reached at the first regulation time;

said interval is further determined as a function of the instantaneous torque set point, the position, and the angular speed of the rotor of said machine;

said time interval is determined for a synchronous machine with smooth poles using the following equations:

$$\sin\left[k \cdot \frac{\pi}{3} - (\rho_0 + \omega \cdot T + \varphi_D)\right] = e^{-\frac{T}{\tau}} \cdot \frac{\left\|\vec{I}_{dq}^D(0)\right\|}{\left\|\vec{I}_{dq}^D(T)\right\|} \cdot \sin\left(k \cdot \frac{\pi}{3} - (\rho_0 + \varphi_0)\right)$$

-continued $$\cos(\varphi_D) = \frac{I_d^D(T)}{\left\|\vec{I}_{dq}^D(T)\right\|} \quad \cos(\varphi_0) = \frac{I_d^D(0)}{\left\|\vec{I}_{dq}^D(0)\right\|}$$

$$\sin(\varphi_D) = \frac{I_q^D(T)}{\left\|\vec{I}_{dq}^D(T)\right\|} \quad \sin(\varphi_0) = \frac{I_q^D(0)}{\left\|\vec{I}_{dq}^D(0)\right\|}$$

$$\vec{I}_{dq}^D(T) = \begin{vmatrix} I_d^D(T) \\ I_q^D(T) \end{vmatrix} = \begin{vmatrix} I_d(T) + \frac{X^2}{L \cdot Z^2} \cdot \Phi_a \\ I_q(T) + \frac{R \cdot X}{L \cdot Z^2} \cdot \Phi_a \end{vmatrix}$$

$$\vec{I}_{dq}^D(0) = \begin{vmatrix} I_d^D(0) \\ I_q^D(0) \end{vmatrix} = \begin{vmatrix} I_d(0) + \frac{X^2}{L \cdot Z^2} \cdot \Phi_a \\ I_q(0) + \frac{R \cdot X}{L \cdot Z^2} \cdot \Phi_a \end{vmatrix}$$

in which:

$\Phi_a$ is the rotor flux of the magnets,

L is the stator inductance of the motor,

X is defined by the equation $X = L \cdot \omega$, where $\omega$ is the angular speed of the rotor, Z is defined by the equation $Z = \sqrt{R^2 + L^2 \omega^2}$, where R is the stator resistance of the machine, $I_d(O)$ and $I_q(O)$ are the components of the instantaneous current vector measured at the regulation time in a rotating system of axes d,q fixed with respect to the rotor flux, the d axis being aligned with the rotor flux, $I_d(T)$ and $I_q(T)$ are the components of the current vector set point corresponding to the instantaneous torque set point in the system of axes d, q, and $\rho_0$ is the angle between the system of axes d, q and a fixed system of axes $\alpha$, $\beta$ that is fixed with respect to the stator windings;

the regulation times are spaced by a time interval equal to T'/2p where p is the number of phases of the machine and T' is the period of the fundamental frequency of the voltage generated by the inverter;

the regulation times are chosen to correspond exactly to times at which the phase of the fundamental of the voltage generated by the inverter is equal to $k\Pi/p$, where k is an integer;

the method includes a step of correcting the instantaneous torque set point if the interval determined crosses a predefined time threshold, this correction step comprising:

a) an operation of taking the value of the threshold that has been crossed as the value of said interval, and b) an operation of establishing a temporary instantaneous torque set point that can be reached using the time interval value established during the operation a);

the method includes a step of correcting the instantaneous torque set point if the input set point to be used during the control step crosses a predefined set point limit, this second correction step comprising:

an operation of establishing a new temporary instantaneous torque set point that complies with the predefined set point limit;

the predefined set point limit is measured at each current regulation time.

The invention also consists in an information storage medium that comprises instructions for executing an instantaneous torque regulation method conforming to the invention when said instructions are executed by an electronic computer.

The invention also consists in a system for regulating the instantaneous torque of a polyphase rotating electrical machine equipped with stator and/or rotor windings supplied by a voltage and a current generated by an inverter formed of switches whose switching is commendable, said system comprising:

a unit for commanding the switching of the switches of the inverter using the fundamental frequency of the voltage generated by the inverter and a form of synchronous pulse width modulation configured as a function of an input set point, and a unit for calculating the input set point from an instantaneous torque set point, and a unit for determining the time interval between two successive regulation times so that, as long as the instantaneous torque set point is constant, that time interval corresponds to an integer multiple of the period of oscillation of the instantaneous torque of the machine caused by second order or higher harmonics of the voltage and/or the current generated by the inverter.

The invention will be better understood after reading the following description, which is given by way of example only and with reference to the drawings.

DETAILED DESCRIPTION OF THE PREFERRED EMBODIMENT

Figure 2:
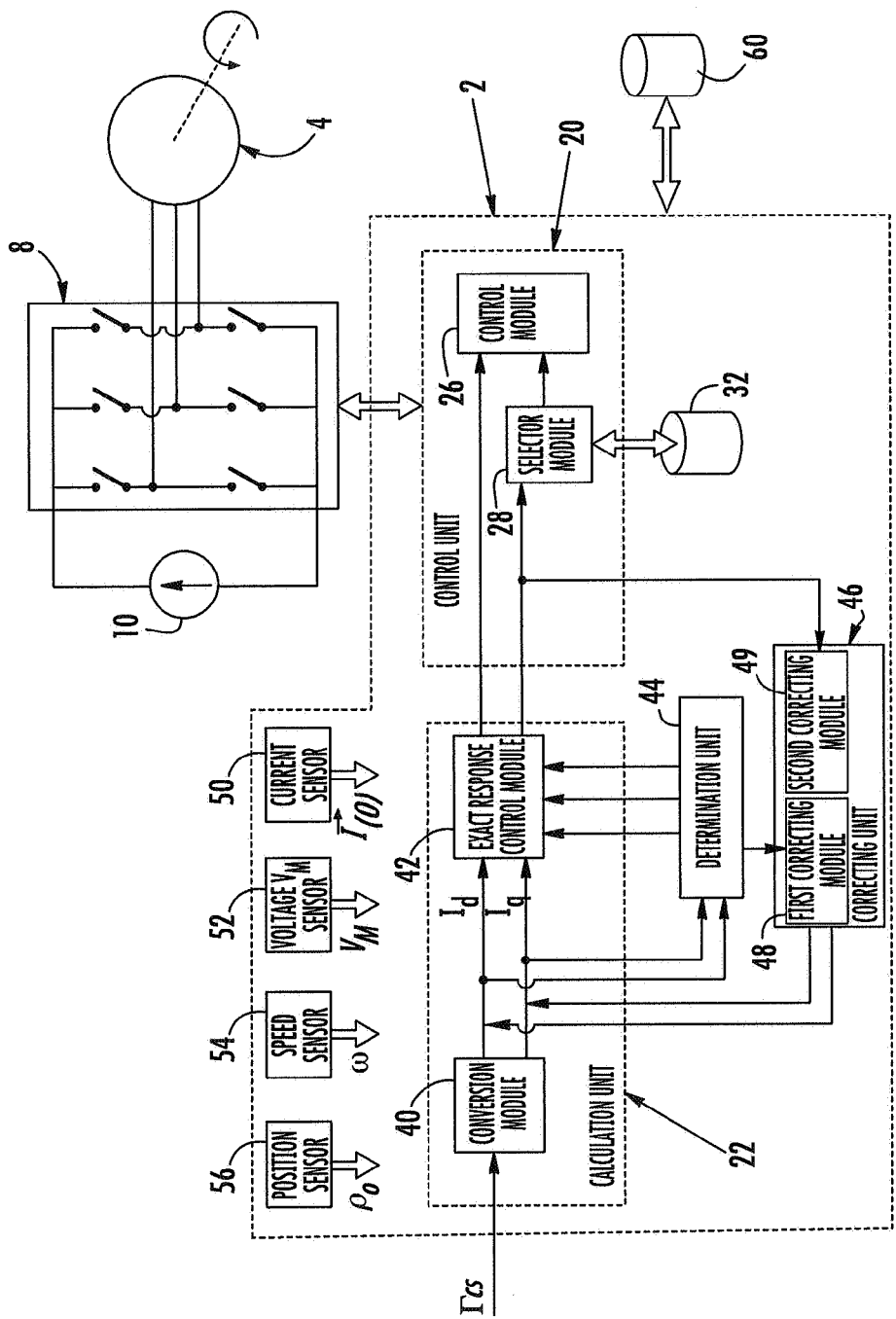
FIG. 2 is a diagrammatic representation of a regulation system according to the invention.

FIG. 2 shows a system 2 for regulating the instantaneous electromagnetic torque of a motor 4 having a stator and a rotor. The remainder of the description refers to the particular situation in which the motor 4 is a smooth pole three-phase synchronous motor with permanent magnets mounted at the surface of the rotor. The motor 4 is equipped with stator windings.

To this end, the system 2 is adapted to receive at its input an instantaneous torque set point $\Gamma_{CS}$ and to deliver at its output control signals for a conventional three-phase inverter 8. The inverter 8 is supplied with power by a direct current voltage source 10.

The inverter 8 conventionally comprises three branches known as "legs" each formed of two switches connected in series by way of a center point. The center point of each leg is connected to the stator windings of the motor 4 to supply each phase of the motor with voltage and current.

The system 2 includes a control unit 20 for controlling the inverter 8 as a function of an input set point and a unit 22 for calculating the input set point as a function of the set point $\Gamma_{CS}$. In this example the input set point is a voltage vector $\vec{V}$ defined by its modulus $\|\vec{V}\|$ and an angle $\beta_0$ in a fixed orthonomic system of axes $\alpha, \beta$ fixed with respect to the stator. The angle $\beta_0$ is defined relative to the axis $\alpha$ of this system of axes. This system of axes is frequently used and will not be described in more detail.

The control unit 20 includes a module 26 for controlling the switching of the switches of the inverter 8 using pulse width modulation and a modulation selector module 28.

Figure 3:
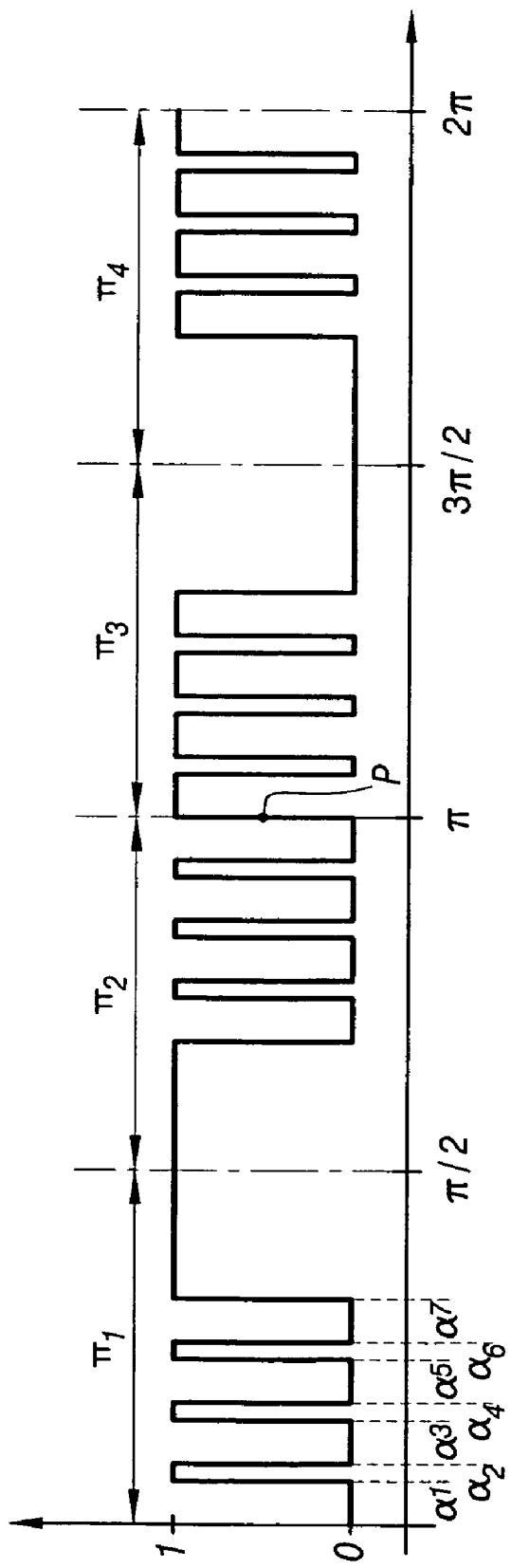
FIG. 3 is a graph representing a switch control signal generated by the FIG. 2 system as a function of time.

The module 26 is adapted to command the switching of the switches of the inverter 8 as a function of the value of the angle $\beta_0$ and of angles $\alpha_i$ selected by the module 28. To this end, the module 26 uses a conventional synchronous pulse width modulation process with the fundamental frequency of the voltage generated by the inverter 8. FIG. 3 represents one example of a control signal generated by the module 26.

FIG. 3 represents the control signal of an upper switch of one leg of the inverter 8 as a function of time. Here, for example, the value 0 of the signal indicates that opening of the switch is commanded and the value 1 indicates that closing of the switch is commanded. FIG. 2 represents the regulation times as a function of the phase of the fundamental frequency of the voltage generated by the inverter 8. The range [0, 2Π] is divided into four sub-ranges $\Pi_1, \Pi_2, \Pi_3$ and $\Pi_4$ of equal size. In the range $\Pi_1$, the switching times of the switch are defined by angles $\alpha_i$. In this example seven angles $\alpha_i$ are necessary for defining the switching of the switch during the interval $\Pi_1$ and the form of pulse width modulation represented here is therefore the "seven-angle" form. The switching times in the intervals $\Pi_2$ to $\Pi_4$ are deduced from those defined for the interval $\Pi_1$ by conventional transformations. The control signals of the other switches are deduced from the FIG. 2 signal by shifting by 2Π/p the signal from FIG. 2, where p is the number of phases of the motor 4.

To eliminate even harmonics and harmonics whose order is a multiple of 3, the control signal here has two axes of symmetry at the abscissae Π/2 and 3Π/2, and a point of symmetry P at the abscissa Π.

Thus a form of modulation is defined once the value of the angles $\alpha_i$ is known.

The value of the angles $\alpha_i$ fixes the modulus of the fundamental frequency of the voltage generated by the inverter and therefore the mean torque of the inverter.

The module 28 is adapted to select and to deliver the value of the angles $\alpha_i$ corresponding to the value of the voltage modulus $\|\vec{V}\|$ received at the input. To this end, the module 28 is associated with a memory 32 containing a table TP of the following form:

| | | | | | | | |
|---|---|---|---|---|---|---|---|
| $\|\vec{V}\|_1$ | $\alpha_{11}$ | $\alpha_{21}$ | $\alpha_{31}$ | $\alpha_{41}$ | $\alpha_{51}$ | $\alpha_{61}$ | $\alpha_{71}$ |
| . | . | . | . | . | . | . | . |
| $\|\vec{V}\|_k$ | $\alpha_{1k}$ | $\alpha_{2k}$ | $\alpha_{3k}$ | $\alpha_{4k}$ | $\alpha_{5k}$ | $\alpha_{6k}$ | $\alpha_{7k}$ |
| . | . | . | . | . | . | . | . |
| $\|\vec{V}\|_m$ | $\alpha_{1m}$ | $\alpha_{2m}$ | $\alpha_{3m}$ | $\alpha_{4m}$ | $\alpha_{5m}$ | $\alpha_{6m}$ | $\alpha_{7m}$ |

This table TP associates with each normalized value $$\|\vec{V}\|_j$$

of the voltage modulus $\|\vec{V}\|$ the value of the angles $\alpha_{ik}$ enabling the inverter 8 to generate a voltage for which the modulus of the fundamental frequency is equal to the modulus $\|\vec{V}\|$. The formula for changing from the normalized value of the modulus $\|\vec{V}\|$ to the value produced by the module 24 is as follows:

$$\|\vec{V}\| = \|\overline{\vec{V}}\| \cdot V_M^{\wedge}$$

where:

$V^{\wedge}_M$ is the instantaneous value of the voltage at the terminals of the source 10.

If the normalized value $$\|\overline{\vec{V}}\|$$

is between two values prestored in the table TP, the selection module 28 is able to calculate the corresponding values of the angles $\alpha_i$ by linear interpolation.

The calculation unit 22 includes a conversion module 40 and an exact response control module 42.

The module 40 is adapted to convert the set point $\Gamma_{CS}$ into a current set point $\vec{I}(T)$ in the conventional way. The current set point $\vec{I}(T)$ is defined here by its components $I_d(T)$ and $I_q(T)$ i a rotating orthonomic system of axes d,q that is fixed with respect to the rotor flux, the axis d being aligned with the rotor flux. This d,q system of axes is conventional, and the change from coordinates expressed in the ad, system of axes to those expressed in the d,q system of axes is effected simply by rotating the reference axes.

The module 42 receives at its input the components $I_q(T)$ and $I_d(T)$ and delivers at its output to the unit 20 the values of the modulus $\|\vec{V}\|$ and the angle $\beta_0$ of the voltage vector.

The module 42 is adapted to calculate the value of the voltage vector $\vec{V}$ so that the instantaneous torque set point corresponding to the set point $\vec{I}(T)$ is reached at the next regulation time. To this end, the modulus 24 uses an exact response control process also known as a "deadbeat control process". The process used here is described in patent application EP-A-123 35 06, for example. Suffice to say, therefore, that the formula used to calculate the value of the voltage vector $\vec{V}$ as a function of the set point $\vec{I}(T)$ is as follows:

$$\vec{V}_{dq} = \begin{vmatrix} V_d \\ V_q \end{vmatrix} = \frac{1}{a(T)} \cdot \begin{vmatrix} I_d(T) - I_d^0(T) \\ I_q(T) - I_q^0(T) \end{vmatrix} \quad (1)$$

wherein:

$$a(T) = \frac{1}{R} \cdot \left(1 - e^{-\frac{T}{\tau}}\right)$$

and:

$$\begin{vmatrix} I_d^0(T) \\ I_q^0(T) \end{vmatrix}$$

is the natural evolution of the instantaneous currents of the stator of the motor when short circuited after a regulation interval T from the original state of the stator current at the preceding current measurement and regulation time.

T is the time interval between the current regulation time and the next regulation time, R is the stator resistance of the motor, L is the stator inductance of the motor, and τ is the stator time constant (τ=L/R).

The angle $\beta_0$ is transmitted directly to the control module 26 and the modulus $\|\vec{V}\|$ is transmitted to the selection module 28.

It will be noted that, to establish the voltage vector $\vec{V}$, the module 42 needs to know the time interval T between two regulation times.

To this end, the system 2 includes a unit 44 adapted to determine the value of the interval as a function of the current set point $\vec{I}(T)$.

In the particular embodiment described here, the system 2 also includes a unit 46 for correcting the instantaneous torque set point if the latter may not be reached at the next regulation time because of functional limitations of the system 2 or the inverter 8. To be more precise, the unit 46 includes a module 48 for correcting the instantaneous torque set point if the interval T determined by the unit 44 exceeds the predefined thresholds $T_{min}$ and $T_{max}$. The unit 46 also includes a module 49 for correcting the instantaneous torque set point if the modulus $\|\vec{V}\|$ delivered by the module 42 delimits a predefined maximum direct current voltage limit $V_M$. To this end, the unit 46 is connected to the unit 44 so that it knows the value of the interval T and to the output of the module 42 so that it knows the value of the modulus $\|\vec{V}\|$. The unit 46 is also connected directly to the input of the module 42 so that it can supply to the latter a corrected instantaneous torque set point in the form of a current set point.

To be more precise, the units 44 and 46 are adapted to carry out the calculations to be described with reference to FIG. 4.

Finally, the system 2 includes a sensor 50 for the current $\vec{I}(O)$ in the stator windings, a sensor 52 for the direct current voltage $V_M$ generated by the source 10, a sensor 54 for the angular speed ω of the rotor of the motor 4, and a sensor 56 for the angular position $\rho_o$ of the rotor of the motor 4.

The sensor 50 is formed of a plurality of individual current sensors each adapted to measure the current in the stator windings of one phase of the motor 4, in order to measure the instantaneous current vector. This sensor 50 is further adapted to transform the instantaneous current vector measured by the Concordia transformation generalized to a polyphase system, so as to deliver directly at the output the two components $I_d(0)$ and $I_q(0)$ of the instantaneous current vector.

These sensors are connected to the units 44 and 46 in particular. However, in order to simplify FIG. 2, these connections are not shown.

The system 2 is typically based on a conventional programmable electronic computer adapted to execute instructions stored on an information storage medium. To this end, the system 2 is associated with a memory 60 containing instructions for executing the FIG. 4 method.

The operation of the system 2 is described next in relation to the FIG. 4 method.

That method comprises two main phases, namely an initialization phase 70 followed by a regulation phase 72.

During the phase 70, the various forms of modulation are constructed during an operation 74 to eliminate certain predetermined harmonics. For example, the operation 74 is carried out with the aid of software simulating a digital model of the inverter 8 and the motor 4. The value of the angles $\alpha_i$ for each form of modulation is determined during this operation 74.

At the end of the operation 74, the sets of angle values $\alpha_i$ determined are stored, during an operation 76, in the memory 32, in which they are associated with the normalized value of the modulus $\|\vec{V}\|$ corresponding to form the table TP.

During this phase 70, the various constant parameters of the motor 4 are also determined and stored in the memory 60, during an operation 78. For example, during this operation 70, the values of the stator inductance L and the stator resistance R of the motor and the value of the flux $\Phi_a$ are stored in the memory 60.

Once the initialization phase has been completed, the regulation phase may begin.

At the current regulation time, the current $\vec{I}(O)$, the direct current voltage $V_m$, the angular position $\rho_o$, and the angular speed $\omega$ are measured by respective sensors 50, 52, 56 and 54, during a step 80.

The module 40 then acquires the value of the instantaneous torque set point $\Gamma_{CS}$ and, in a conventional way, converts that torque set point $\Gamma_{CS}$ into a current set point $\vec{I}(T)$ during a step 82.

Then, during a step 86, the unit 44 determines the value of the interval T between the current regulation time and the next regulation time. This step begins with an operation 90 during which the unit 44 establishes the values of the parameters $I_d^D(O)$, $I_q^D(O)$, $I_d^D(T)$ and $I_q^D(T)$ using the following equations:

$$\vec{I}_{dq}^D(T) = \begin{vmatrix} I_d^D(T) \\ I_q^D(T) \end{vmatrix} = \begin{vmatrix} I_d(T) + \frac{X^2}{L \cdot Z^2} \cdot \Phi_a \\ I_q(T) + \frac{R \cdot X}{L \cdot Z^2} \cdot \Phi_a \end{vmatrix} \quad (2)$$

$$\vec{I}_{dq}^D(0) = \begin{vmatrix} I_d^D(0) \\ I_q^D(0) \end{vmatrix} = \begin{vmatrix} I_d(0) + \frac{X^2}{L \cdot Z^2} \cdot \Phi_a \\ I_q(0) + \frac{R \cdot X}{L \cdot Z^2} \cdot \Phi_a \end{vmatrix}$$

in which:

$\Phi_a$ is the rotor flux from the magnets,

L is the stator inductance of the motor 4,

X is defined by the equation $X = L \cdot \omega$, where $\omega$ is the angular speed measured at this regulation time, Z is defined by the equation $Z = \sqrt{R^2 + L^2 \cdot \omega^2}$, where R is the stator resistance of the motor 4, $I_d(O)$ and $I_q(O)$ are the coordinates in the system of axes d,q of the instantaneous current vector $\vec{I}(O)$ measured by the sensor 50 at this regulation time, and $I_d(T)$ and $I_q(T)$ are the components of the current vector set point delivered by the module 40.

From the values of the parameters $I_d^D(O)$, $I_q^D(O)$, $I_d^D(T)$ and $I_q^D(T)$ established during the operation 90, the unit 44 establishes the values of the angles $\phi_d$ and $\phi_o$ during an operation 92, using the following equations:

$$\cos(\varphi_D) = \frac{I_d^D(T)}{\|\vec{I}_{dq}^D(T)\|} \quad \cos(\varphi_0) = \frac{I_d^D(0)}{\|\vec{I}_{dq}^D(0)\|} \quad (17)$$

$$\sin(\varphi_D) = \frac{I_q^D(T)}{\|\vec{I}_{dq}^D(T)\|} \quad \sin(\varphi_0) = \frac{I_q^D(0)}{\|\vec{I}_{dq}^D(0)\|}$$

in which the symbol $\| \ldots \|$ represents the modulus of a vector.

As explained above, the instantaneous torque is made up of a substantially constant torque $\Gamma_m$ and a pulsating torque. This being so, forms of pulse width modulation are constructed that eliminate the even harmonics and the harmonics of order 3n, where n is an integer, since it has been established that the period of the pulsating torque is T'/2p, where T' is the period of the fundamental frequency of the voltage generated by the inverter and p is the number of phases of the motor 4. To be more precise, it has been found that the instantaneous torque repeats each time that the voltage vector $\vec{V}$ is at an angle $k\Pi/p$ to the axis $\alpha$ of the system of axes $\alpha,\beta$.

To this end, to determine the time interval T, there is added to the system of equations (1) a further equation expressing the fact that the phase of the voltage vector $\vec{V}$ must be a multiple of $k \times \Pi/3$. For example, this is expressed by the following mathematical relationship:

$$V_\alpha \cdot \sin\left(k \cdot \frac{\pi}{3}\right) - V_\beta \cdot \cos\left(k \cdot \frac{\pi}{3}\right) = 0 \quad (4)$$

in which $V_\alpha$ and $V_\beta$ are the coordinates of the voltage vector $\vec{V}$ in the system of axes $\alpha,\beta$.

It will be noted that the system of equations (1) is a system of two equations in three unknowns (T, $V_d$ and $V_q$) and that it is therefore always possible to find a solution to the system of equations (1), even if an additional constraint is added to the unknowns $V_d$ and $V_q$.

An analytical solution for the system of equations (1) to which the equation (4) is added is expressed by the following equation:

$$\sin\left[k \cdot \frac{\pi}{3} - (\rho_0 + \omega \cdot T + \varphi_D)\right] = e^{-\frac{T}{\tau}} \cdot \frac{\|\vec{I}_{dq}^D(0)\|}{\|\vec{I}_{dq}^D(T)\|} \cdot \quad (5)$$

$$\sin\left(k \cdot \frac{\pi}{3} - (\rho_0 + \varphi_0)\right)$$

in which:

ρ₀ is the angle of the system of axes d,q relative to the system of axes α,β, this angle ρ₀ being measured by the sensor 56, and k is an integer from the set {0,1,2,3,4,5}.

The other variables of the above equation have already been defined in relation to the operations 90 and 92.

The unit 44 determines the value of the interval T by solving the equation (5) by successive iterations. To be more precise, during an operation 94, the unit 44 sets an initial value $T_S$ for the interval T and calculates the right-hand member of the equation (5) for this value $T_S$. To obtain fast convergence toward a result, the value $T_S$ is made equal to $1/(6 \cdot N_p \cdot F_m)$, where $N_p$ is the number of pairs of poles of the motor 4 and $F_m$ is the mechanical frequency of the rotor of the motor 4 measured by the sensor 54.

Then, during an operation 96, the unit 44 calculates the value of the interval T for the left-hand member to correspond to the value established for the right-hand member during the operation 94.

The unit 44 then returns to the operation 94, choosing for the initial value $T_S$ that established for the interval T during the operation 96.

Thus the operations 94 and 96 are iterated until the value of the interval T is established with sufficient accuracy.

Then, during an operation 98, the value of the interval T is compared to the time thresholds $T_{min}$ and $T_{max}$. Below the threshold $T_{min}$, the time interval T is too short for the calculations to be carried out in real time. Above the threshold $T_{max}$, the regulation times are too far apart, which leaves the motor out of control for too long.

If the value of the interval T is between the two thresholds $T_{min}$ and $T_{max}$, a step 99 of calculating the modulus $\|\vec{V}\|$ and the angle $\beta_0$ is executed.

If, during the comparison operation 98, the value of the interval T previously established exceeds one of these thresholds, the module 48 carries out a first step 100 of correcting the instantaneous torque set point.

At the start of the step 100, during an operation 102, the value of the interval T is set to the value of the threshold that has been exceeded, i.e. to the value of the threshold $T_{min}$ or the threshold $T_{max}$.

Then, during an operation 104, a new temporary instantaneous torque set point that may be reached in the interval T fixed during the operation 102 is established. To this end, the relation 5 is solved for the situation in which the value of the interval T is that established during the operation 102 and by fixing the value either of $I_d(T)$ or of $I_q(T)$. For example, if the aim is to maintain the torque, the value of $I_q(T)$ is made equal to that established by the module 40 and the value $I_d(T)$ is the unknown. The equation (5) is then written in the form:

$$I_{d_k}^D = \frac{1}{\sin\left[k \cdot \frac{\pi}{3} - (\rho_0 + \omega \cdot T_m)\right]} \cdot \left\{ I_q^D \cdot \cos\left[k \cdot \frac{\pi}{3} - (\rho_0 + \omega \cdot T_m)\right] + e^{-\frac{T_m}{\tau}} \left\{ I_d^D(0) \cdot \sin\left(k \cdot \frac{\pi}{3} - \rho_0\right) - I_q^D(0) \cdot \cos\left(k \cdot \frac{\pi}{3} - \rho_0\right) \right\} \right\} \quad (6)$$

in which:

$T_m$ is the value of the interval T fixed during the operation 102.

If the aim is to maintain the de-excitation, the value of $I_d(T)$ is set at that established by the module 40 and the value of $I_q(T)$ is established using the following equation:

$$I_{q_k}^D = \frac{1}{\cos\left[k \cdot \frac{\pi}{3} - (\rho_0 + \omega \cdot T_m)\right]} \cdot \left\{ I_d^D \cdot \sin\left[k \cdot \frac{\pi}{3} - (\rho_0 + \omega \cdot T_m)\right] - e^{-\frac{T_m}{\tau}} \left\{ I_d^D(0) \cdot \sin\left(k \cdot \frac{\pi}{3} - \rho_0\right) - I_q^D(0) \cdot \cos\left(k \cdot \frac{\pi}{3} - \rho_0\right) \right\} \right\} \quad (7)$$

The unit 44 solves the equation (6) or the equation (7) by successive iterations in a similar manner to that described with reference to the operations 94 and 96.

At the end of the step 100, the method proceeds to the step 99.

During the step 99, an exact response control method is executed to establish the voltage vector $\vec{V}$ from the set point $\vec{I}(T)$ and the value of the interval T. Because this method is described in the patent EP A 123 35 06, it need not be described in detail here.

During a step 110, the unit 46 compares the modulus $\|\vec{V}\|$ generated by the module 42 to the voltage limit $V_M$ measured by the sensor 52. If the modulus $\|\vec{V}\|$ is not above the limit $V_M$, the method continues with a step 112 of commanding the switching of the switches of the inverter 8.

Otherwise, the unit 46 carries out a second step 114 of correcting the instantaneous torque set point.

A temporary instantaneous torque set point is calculated during the step 114. To this effect, the equation (5) is solved allowing for an additional constraint whereby a voltage modulus $\|\vec{V}\|$ may not exceed the limit $V_M$. This additional constraint is expressed by the following equation:

$$[I_d^D(T) - I_d^{oD}(T)]^2 + [I_q^D(T) - I_q^{oD}(T)]^2 = a(T)^2 \cdot V_M^2 \quad (8)$$

in which:

$I_d^{oD}(T)$ and $I_q^{oD}(T)$ represent the natural evolution of the motor for a null voltage and are defined in the patent EP A 123 35 06.

The system of equations consisting of the equations (5) and (8) may equally be written in the form:

$$I_d(T) = \pm a(T) \cdot V_M \cdot \cos\left[k \cdot \frac{\pi}{3} - (\rho_0 + \omega \cdot T)\right] + \quad (9)$$

$$\frac{-X^2}{L \cdot Z^2} \cdot \Phi_a + e^{-\frac{T}{\tau}} \cdot \left\|\vec{I}_{dq}^D(0)\right\| \cdot \cos(\omega \cdot T - \varphi_0)$$

$$I_q(T) = \pm a(T) \cdot V_M \cdot \sin\left[k \cdot \frac{\pi}{3} - (\rho_0 + \omega \cdot T)\right] +$$

$$\frac{-R \cdot X}{L \cdot Z^2} \cdot \Phi_a - e^{-\frac{T}{\tau}} \cdot \left\|\vec{I}_{dq}^D(0)\right\| \cdot \sin(\omega \cdot T - \varphi_0)$$

The system of equations (9) consists of two equations both of which enable the interval T to be calculated from coordinates of the current set point vector $\vec{I}(T)$. If the voltage limit $V_M$ is reached, it is generally no longer possible to impose $I_q(T)$, $I_d(T)$ and the corresponding value of the interval T. Thus reaching the voltage limit $V_M$ loses one degree of freedom. To solve the system (9), during an operation 116, the module 49 fixes one of the two components of the current vector $\vec{I}(T)$ and calculates the time interval T using one of the two equations of the system (9).

Then, during operation 118, using the other equation of the system 26 and the interval value T calculated during the operation 116, the value of the other coordinate of the current set point vector $\vec{I}$(T) is calculated.

For example, if the value of the component $I_q$(T) is made equal to the value applied to the input of the module 42, the value of the time interval T is defined by the following equations:

$$T = \frac{1}{\omega} \cdot \left\{ \arccos\left(\frac{I_q^D(T)}{M}\right) + \text{sign}(B) \cdot \text{Arccos}\left(\frac{A}{M}\right) + \varphi_0 - \frac{\pi}{2} \right\} \quad (10)$$

$$A = \pm a(T) \cdot V_M \cdot \cos\left(k \cdot \frac{\pi}{3} - \rho_0 - \varphi_0\right) + e^{-\frac{T}{\tau}} \cdot \left\|\vec{I}_{dq}^D(0)\right\|$$

$$B = \pm a(T) \cdot V_M \cdot \sin\left(k \cdot \frac{\pi}{3} - \rho_0 - \varphi_0\right)$$

$$M = \sqrt{A^2 + B^2}$$

Another possibility is to set the value of the component $I_d$(T) and to calculate the interval T using the following equations:

$$T_n = \frac{1}{\omega} \cdot \left\{ \arccos\left(\frac{I_d^D}{M}\right) + \text{sign}(B) \cdot \text{Arccos}\left(\frac{A}{M}\right) + \varphi_0 \right\} \quad (11)$$

$$A = \pm a(T) \cdot V_M \cdot \cos\left(k \cdot \frac{\pi}{3} - \rho_0 - \varphi_0\right) + e^{-\frac{T}{\tau}} \cdot \left\|\vec{I}_{dq}^D(0)\right\|$$

$$B = \pm a(T) \cdot V_M \cdot \sin\left(k \cdot \frac{\pi}{3} - \rho_0 - \varphi_0\right)$$

$$a(T) = \frac{1}{R} \cdot \left(1 - e^{-\frac{T}{\tau}}\right)$$

$$M = \sqrt{A^2 + B^2}$$

At the end of the step 114, the method returns to the step 98 of comparing the value of the interval T to the thresholds $T_{min}$ and $T_{max}$.

In the step 112, during an operation 130, the selection module 28 selects in the memory 32 the values of the angles $\alpha_i$ corresponding to the modulus $\|\vec{V}\|$ and delivers those angles to the module 26.

Then, during an operation 132, the module 26 commands the switching of the switches of the inverter 8 using the form of pulse width modulation defined by the angles $\alpha_i$ received.

Until the next regulation time, the module 26 continues to command the switches of the inverter 8 using the same form of modulation.

At the end of the step 112, and at the next regulation time, the method returns to the step 80.

Figure 1:
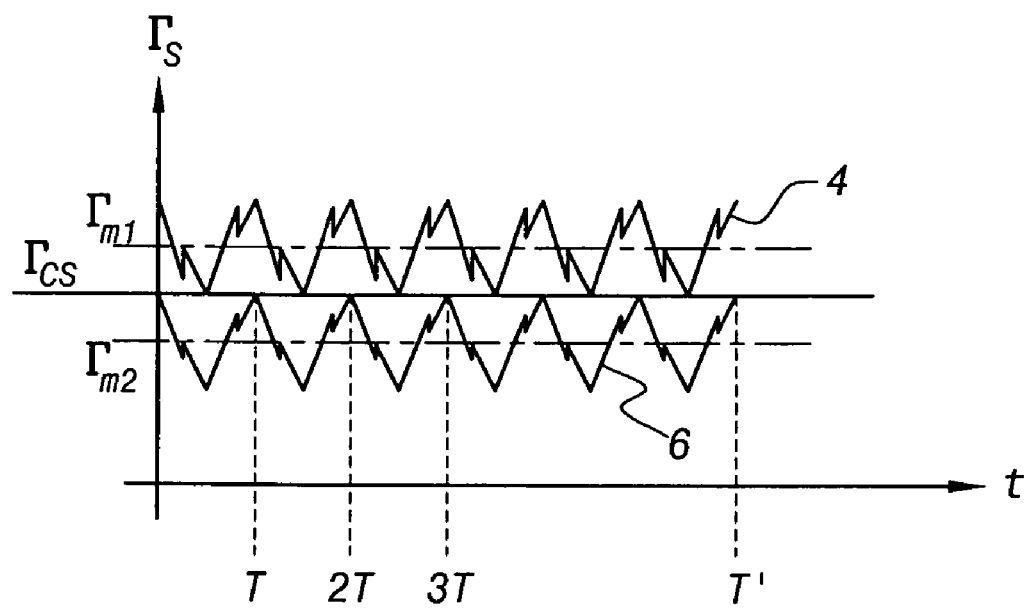
FIG. 1 is a graph representing the instantaneous torque as a function of time.

Thus the above method regulates the instantaneous torque only at times at which the phase of the voltage vector $\vec{V}$ is at an angle $k \times \Pi/3$ to the axis $\alpha$ of the system of axes $\alpha,\beta$. Thanks to this property, the instantaneous torque is regulated only at integer multiples of the period of the oscillations of the instantaneous torque generated by the voltage harmonics. As explained with reference to FIG. 1, this limits the changes of modulation and therefore the generation of uncontrolled harmonics.

Figure 4:
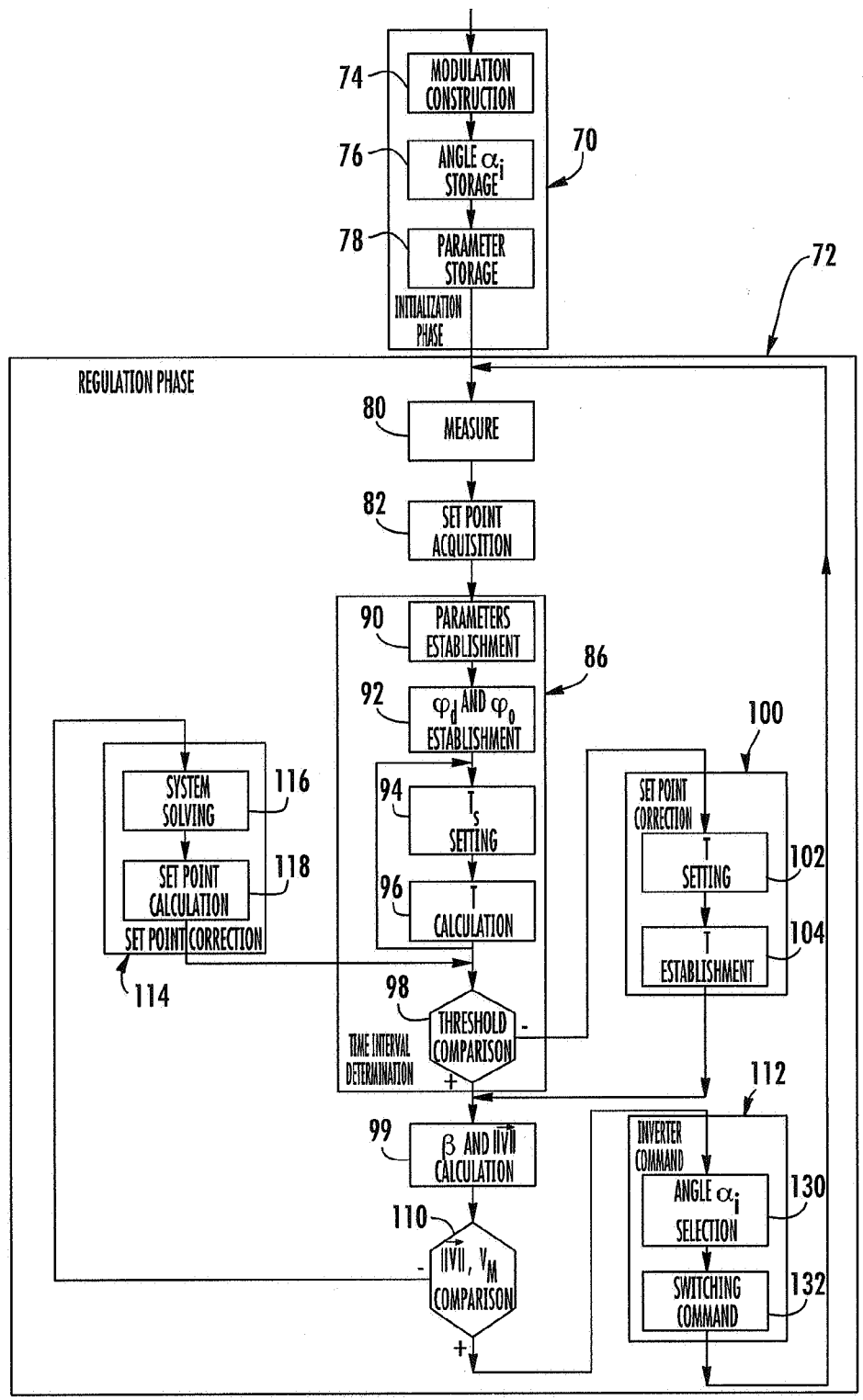
FIG. 4 is a flowchart of a regulation method according to the invention.

Thus the FIG. 4 method combines the advantages of an exact response control method and the advantages associated with the use of synchronous pulse width modulation. In particular, this method has a wide dynamic range and guarantees the absence of certain harmonics.

There is claimed:

1. A method of regulating the instantaneous electromagnetic torque of a polyphase rotating electrical machine equipped with stator and/or rotor windings supplied by a voltage and a current generated by an inverter formed of switches whose switching is controllable, said method comprising:

a step of commanding the switching of said switches of said inverter using a pulse width modulation synchronous with the fundamental frequency of said voltage generated by said inverter, wherein the pulse width modulation is configured as a function of an input set point, and a step of calculating said input set point from an instantaneous torque set point at each regulation time, and a step of determining the time interval (T) between two successive regulation times so that, as long as said instantaneous torque set point is constant, that time interval corresponds to an integer multiple of the period of oscillation of said instantaneous torque of said machine caused by second order or higher harmonics of said voltage and/or said current generated by said inverter.

2. A method claimed in claim 1, wherein said calculation step uses an exact response control method such that said instantaneous torque set point is reached at said first regulation time.

3. A method claimed in claim 1, for a machine equipped with a rotor, wherein said interval is further determined as a function of said instantaneous torque set point ($\Gamma_{CS}$), the position ($\rho_0$), and the angular speed ($\omega$) of said rotor of said machine.

4. A method claimed in claim 3, wherein said time interval (T) is determined for a synchronous machine with smooth poles using the following equations:

$$\sin\left[k \cdot \frac{\pi}{3} - (\rho_0 + \omega \cdot T + \varphi_D)\right] = e^{-\frac{T}{\tau}} \cdot \frac{\left\|\vec{I}_{dq}^D(0)\right\|}{\left\|\vec{I}_{dq}^D(T)\right\|} \cdot \sin\left(k \cdot \frac{\pi}{3} - (\rho_0 + \varphi_0)\right)$$

$$\cos(\varphi_D) = \frac{I_d^D(T)}{\left\|\vec{I}_{dq}^D(T)\right\|} \quad \cos(\varphi_0) = \frac{I_d^D(0)}{\left\|\vec{I}_{dq}^D(0)\right\|}$$

$$\sin(\varphi_D) = \frac{I_q^D(T)}{\left\|\vec{I}_{dq}^D(T)\right\|} \quad \sin(\varphi_0) = \frac{I_q^D(0)}{\left\|\vec{I}_{dq}^D(0)\right\|}$$

$$\vec{I}_{dq}^D(T) = \begin{vmatrix} I_d^D(T) \\ I_q^D(T) \end{vmatrix} = \begin{vmatrix} I_d(T) + \frac{X^2}{L \cdot Z^2} \cdot \Phi_a \\ I_q(T) + \frac{R \cdot X}{L \cdot Z^2} \cdot \Phi_a \end{vmatrix}$$

$$\vec{I}_{dq}^D(0) = \begin{vmatrix} I_d^D(0) \\ I_q^D(0) \end{vmatrix} = \begin{vmatrix} I_d(0) + \frac{X^2}{L \cdot Z^2} \cdot \Phi_a \\ I_q(0) + \frac{R \cdot X}{L \cdot Z^2} \cdot \Phi_a \end{vmatrix}$$

in which:

$\Phi_a$ is the rotor flux of the magnets,

L is the stator inductance of the motor,

X is defined by the equation $X = L \cdot \omega$, where $\omega$ is the angular speed of the rotor, Z is defined by the equation $Z = \sqrt{R^2 + L^2 \omega^2}$, where R is the stator resistance of the machine, $I_d$(O) and $I_q$(O) are the components of the instantaneous current vector measured at the regulation time in a rotating system of axes d,q fixed with respect to the rotor flux, the d axis being aligned with the rotor flux, $I_d(T)$ and $I_q(T)$ are the components of the current vector set point corresponding to the instantaneous torque set point in the system of axes d, q, and $\rho_0$ is the angle between the system of axes d, q and a fixed system of axes $\alpha$, $\beta$ that is fixed with respect to the stator windings.

5. A method claimed in claim 1, wherein said regulation times are spaced by a time interval equal to T'/2p where p is the number of phases of said machine and T' is the period of said fundamental frequency of said voltage generated by said inverter.

6. A method claimed in claim 5, wherein said regulation times are chosen to correspond exactly to times at which the phase of said fundamental frequency of said voltage generated by said inverter is equal to kΠ/p, where k is an integer.

7. A method claimed in claim 1, including a step of correcting said instantaneous torque set point if the interval (T) determined crosses a predefined time threshold, this correction step comprising:
  a) an operation of taking the value of the threshold that has been crossed as the value of said interval, and
  b) an operation of establishing a temporary instantaneous torque set point that can be reached using the time interval value established during the operation a).

8. A method claimed in claim 1, including a step of correcting said instantaneous torque set point if the input set point to be used during the control step crosses a predefined set point limit, this second correction step comprising:
  an operation of establishing a new temporary instantaneous torque set point that complies with the predefined set point limit.

9. A method claimed in claim 8, wherein said predefined set point limit is measured at each current regulation time.

10. An information storage medium comprising instructions for executing a regulation method conforming to claim 1, when said instructions are executed by an electronic computer.

11. A system for regulating the instantaneous electromagnetic torque of a polyphase rotating electrical machine equipped with stator and/or rotor windings supplied by a voltage and a current generated by an inverter formed of switches whose switching is commandable, said system comprising:

a unit to command the switching of said switches of said inverter using a pulse width modulation synchronous with the fundamental frequency of the voltage generated by said inverter wherein the pulse width modulation is configured as a function of an input set point, and a unit to calculate said input set point from an instantaneous torque set point, and a unit to determine the time interval (T) between two successive regulation times so that, as long as said instantaneous torque set point is constant, that time interval corresponds to an integer multiple of the period of oscillation of the instantaneous torque of said machine caused by second order or higher harmonics of said voltage and/or said current generated by said inverter.

* * * * *